Patented July 19, 1932

1,868,451

UNITED STATES PATENT OFFICE

SAMUEL F. WALTON, OF HAMBURG, NEW YORK, ASSIGNOR TO THE EXOLON COMPANY, OF BLASDELL, NEW YORK, A CORPORATION OF MASSACHUSETTS

PROTECTIVE REFRACTORY GLAZE AND METHOD OF APPLYING THE SAME TO REFRACTORY BODIES CONTAINING SILICON-CARBIDE

No Drawing.   Application filed April 23, 1928.   Serial No. 272,348.

This invention involves the protective coating of clay-bonded silicon carbide refractory bodies as, for example, retorts, muffles, crucibles, and other refractory shapes of various kinds and various uses, from the deleterious effects of exposure to combustion gases, and particularly to combustion gases containing a high percentage of sulphur or noticeable percentage of ash containing alkalies or alkaline earths such as lime. It has been noted that the outer surfaces of the retort, muffle, or other silicon carbide body so exposed to attack by such gases soon becomes corroded and pitted and after a time this condition extends to such a depth that the retort or other body is weakened or destroyed.

In order, therefore, to protect the silicon carbide body from the effects of combustion gas corrosion, I have devised my present invention. Essentially, my concept consists in the application to the silicon carbide body as an outer protective non-shrinking skin or coating, a substance which will have a high resistance to combustion gas corrosion, such coating being fused into the silicon carbide body so as to be practically homogeneous therewith. Such coating may be variously applied and may be of varying composition according to the use to which the particular silicon carbide body is to be put.

In a characteristic procedure, I apply to the outer surface of the silicon carbide body as a skin or coating, a mixture consisting of a pre-burned or pre-fused aluminum silicate and a raw aluminum silicate in which the pre-burned aluminum silicate exceeds the raw aluminum silicate. Such pre-burned or pre-fused aluminum silicate may be calcined clay or calcined aluminum silicate rock or fused aluminum silicates and the raw aluminum silicate may be clay. The mixture may be made up into a slurry, with water and a suitable temporary binder, such as dextrine or other starchy derivative, and painted onto the retort with a brush or blown on with an air brush while the retort is warm after being dried, or the mixture may be applied to the wet retort as it is extruded from the press by means of air pressure or other suitable method, or it may be applied to the undried retort after it has been removed from the press. The exact moment of application to the retort is immaterial in that when the retort so coated is dried, if not dry already, and is otherwise in condition to be fired or burned, the protective coating on burning is fused to the retort in such a way as to become practically integral therewith and will not shrink or crack or peel off.

In a characteristic mixture which I have used successfully, I take 70% of finely pulverized fused aluminum silicate and mix it with 30% of finely pulverized raw aluminum silicate adding, if desired, a suitable temporary binder which may be 1% dextrine or other substance possessing the requisite binding qualities. I make this mixture up into a slurry with water and apply it in an even coat over the outer surface of the dry retort while warm. The coating dries immediately and the retort is then ready to fire or burn in the usual way. The coating may be applied as thick as desired.

Where fused aluminum silicate is used, it may be any of the artificial fused silicates now available. For the raw aluminium silicate, I may use the same clay as we used to bond the silicon carbide in the refractory body, that is a clay having high refractoriness and good vitrification range.

Although I have indicated as desirable the use of a pre-burned or pre-fused aluminum silicate and a raw or unburned or unfused aluminum silicate, I do not however limit myself to this mixture alone as I have found that a pre-burned or pre-fused aluminum silicate and a temporary binder may be used in my wet process or the pre-burned or pre-fused aluminum silicate may be used with or without the temporary binder in my dry method of applying the coating.

The clay lies on the body of the retort or the refractory surface as the body is extruded from the press and such surface affords an efficient carrier for the protective coating which fuses thereon as a practically integral refractory glaze.

Various modifications in methods and ingredients may be resorted to within the spirit and scope of my invention as defined by the appended claims.

What I therefore claim and desire to secure by Letters Patent is:

1. The method of protecting clay-bonded silicon carbide bodies against corrosion which consists in fusing onto the body a refractory glaze, composed of finely pulverized pre-fused aluminum silicate, and a raw or unburned or unfused aluminum silicate of substantially the same composition as the bond for the silicon carbide body in which mixture the pre-fused aluminum silicate exceeds the raw aluminum silicate which coating is fused on the silicon carbide body as an exterior practically integral skin.

2. The method of protecting clay bonded silicon carbide bodies against corrosion which consists in fusing onto the body as an exterior practically integral coating, a refractory glaze composed of a mixture of finely pulverized pre-fused aluminum silicate with raw or unburned or unfused aluminum silicate of substantially the same composition as the bond for the silicon carbide body, and a temporary binder.

3. The method of protecting clay-bonded silicon carbide bodies against corrosion which consists in fusing onto the body as an exterior practically integral coating a refractory glaze composed of a mixture of finely pulverized pre-fused aluminum silicate with raw or unburned or unfused aluminum silicate or substantially the same composition as the bond for the silicon carbide body, the percentage of pre-fused aluminum silicate exceeding that of the raw aluminum silicate.

4. The method of protecting clay-bonded silicon carbide bodies against corrosion which consists in fusing onto the body as an exterior practically integral coating a refractory glaze composed of a mixture of finely pulverized pre-fused aluminum silicate with raw or unburned or unfused aluminum silicate of substantially the same composition as the bond for the silicon carbide body, and a temporary binder, the percentage of pre-fused aluminum silicate exceeding that of the raw aluminum silicate.

5. The method of protecting clay bonded silicon carbide bodies against corrosion which consists in fusing onto the body as an exterior practically integral coating, a refractory glaze composed of a mixture of finely divided pre-fused aluminum silicate and raw aluminum silicate of substantially the same composition as the clay bond of the silicon carbide body whereby the union of the clay coating with the body is unaffected by unequal expansions of the coating and body.

6. As a new article, a clay bonded silicon carbide body having a protective coating of substantially the same coefficient of expansion as the body fused to said body as an adherent practically integral skin or glaze, said coating being of such composition that the union of the coating with the body is unaffected by unequal expansions of the coating and body, and said coating consisting of a mixture of finely divided pre-fused aluminum silicate of low expansion and raw aluminum silicate of substantially the same composition as the clay bond of the body.

7. An article as claimed in claim 6, wherein the percentage of prefused aluminum silicate exceeds that of the raw aluminum silicate.

In testimony whereof I affix my signature.

SAMUEL F. WALTON.